United States Patent [19]

Cole, Jr.

[11] Patent Number: 4,830,737

[45] Date of Patent: May 16, 1989

[54] APPARATUS AND METHOD FOR CONTROLLING THE FLOW OF FOAM AT LOW FLOW RATES

[76] Inventor: Howard W. Cole, Jr., Rte. 2, Box 80, Waterworks Rd., Danville, Ky. 40422

[21] Appl. No.: 123,569

[22] Filed: Nov. 16, 1987

[51] Int. Cl.$^4$ .................... B03D 1/14; B67D 5/08; B67D 5/14

[52] U.S. Cl. .................... 209/164; 209/168; 209/170; 210/221.1; 210/703; 222/56; 222/64; 222/61; 222/105; 91/275; 92/130 B; 261/DIG. 26; 417/392; 417/395

[58] Field of Search ............ 209/164, 168, 169, 170; 210/221.2, 221.1, 703, 704; 222/56, 61, 190, 64, 105, 386.5; 169/61, 14; 417/394, 392, 395; 91/275; 92/130 B; 261/81, 82, DIG. 26; 252/307

[56] References Cited

U.S. PATENT DOCUMENTS

| | | | |
|---|---|---|---|
| 1,279,040 | 9/1918 | Thomas | 209/170 |
| 3,642,617 | 2/1972 | Brink | 210/221.1 |
| 3,749,526 | 7/1973 | Ferratino | 417/394 |
| 3,811,660 | 5/1974 | Cole, Jr. | 261/18.1 |
| 4,176,586 | 12/1979 | Stoll | 91/275 |
| 4,207,202 | 6/1980 | Cole, Jr. | 261/28 |
| 4,213,545 | 7/1980 | Thompson | 222/386.5 |
| 4,229,143 | 10/1980 | Ducher | 417/392 |
| 4,400,220 | 8/1983 | Cole, Jr. | 134/18 |
| 4,420,098 | 12/1983 | Bennett | 222/190 |
| 4,474,680 | 10/1984 | Kroll | 261/DIG. 26 |
| 4,498,318 | 2/1985 | Mitter | 222/56 |
| 4,634,430 | 1/1987 | Polaschegg | 417/395 |

FOREIGN PATENT DOCUMENTS 210245  1/1924  United Kingdom .............. 209/170

Primary Examiner—David L. Lacey
Assistant Examiner—Thomas M. Lithgow
Attorney, Agent, or Firm—Middleton & Reutlinger

[57] ABSTRACT

Apparatus for controlling the flow of a foam uses a bellow enclosed in a housing. The bellows is filled with foam under pressure from a foam generator and expands a preselected amount at which point the flow of foam into the bellows is interrupted. Simultaneously with the interrupting of the flow of foam into the bellows, air under pressure is routed into the housing which causes the bellows to collapse forcing the foam out of the bellows. The apparatus is particularly useful in the froth flotation (benefication) of minerals.

15 Claims, 1 Drawing Sheet

APPARATUS AND METHOD FOR CONTROLLING THE FLOW OF FOAM AT LOW FLOW RATES

BACKGROUND OF THE INVENTION

Froth flotation, or benefication as it is sometimes called, is a concentration process for separating the fine valuable minerals from their gangue impurities. To effect benefication, mineral-bearing ores are ground in water to form a mixture of mineral particles and non-mineral gangue particles. The resulting mixture (water, ore, mineral particles, and gangue particles) is conditioned with various chemicals including froth-producing compounds and agitated in flotation machines which introduce and disperse air in the form of bubbles throughout the pulp to liberate the mineral particles from the gangue particles. The bubbles collect at the surface of the pulp as a froth in which the valuable mineral particles are entrapped. The separated minerals are then either skimmed off or overflow with the froth to concentrate tanks, from which the minerals are then extracted for further processing.

There are many different flotation machines, but all require the formation of some type of air bubbles in the pulp. The size of the air pockets (bubbles) in the pulp is determined by many factors including the air pressure, hole size, agitation of the pulp, etc. In one type of machine compressed air is introduced under or into the pulp by perforated pipes or by expelling the air through multihole plates or fine mesh screens.

It is desirable to have the air pockets as small as possible to more efficiently separate the valuable fine mineral particles from the non-mineral gangue particles. However, present commercial equipment cannot produce air pockets much less than 1/64 inch diameter (0.015"); rather, they normally produce much larger bubbles between 1/32 and ¼ inch diameter.

I have found by actual measurement, that the small bubble foam produced by equipment constructed according to my U.S. Pat. Nos. 3,811,660 and 4,400,220 have bubbles from 50 to 200 micron diameter (0.05 to 0.2 mm) (0.002–0.008 inches) when first ejected from the foam generator. These bubbles exist in a matrix consisting of water and surfactant in the form of highly stressed films surrounding small pockets of air. When this foam is introduced into a tank containing a pulp consisting of ground ore containing fine mineral and non-mineral (gangue) particles, the water film of the mass of bubbles disperses into the water of the pulp, leaving each bubble as a pocket of air surrounded by water. This results in a mass of air pockets which forms a froth which is very effective in entrapping the mineral particles. Thus, by using my small bubble foam the efficiency of the flotation machines is greatly improved.

The density (weight per unit volume) of the water into which the very small air pockets are introduced varies with the number of air pockets per unit volume of water. Therefore, it is necessary to accurately control the amount of air in the form of small air pockets introduced into the flotation machines.

Typical small bubble foam generators of the type described in my U.S. Pat. Nos. 3,811,660 and 4,400,220 produce too much foam (too many bubbles). Therefore, it is necessary to produce a very low foam flow rate which can be precisely controlled but which still maintains the small bubble size which is the concern of my aforementioned patents.

In accordance with my U.S. Pat. No. 3,811,660, it is necessary to cause the air, water, and surfactant mixture to be subject to "substantial agitation" to produce small bubble foam. This process is performed by causing the mixture to flow at or above a minimum velocity through a pipe, hose or foamer (a unit having "tortuous passages"), or through a foamer as shown in my U.S. Pat. No. 4,207,202.

Many other applications for "small bubble" foam require very small flow rates of the foam. These rates may be less than 1/16 gallon per minute. The problem of producing very small flow rates of small bubble foam is two fold. One is the requirement for metering such small quantities of air, water, and surfactant on a continuous basis, and the second is the requirement for providing "substantial agitation" through some foaming device.

SUMMARY OF THE INVENTION

In one embodiment, the present invention provides an apparatus for controlling a bellows housing having a bellows therein, foam supply means in flow communication with the interior of the bellows and operable in response to the bellows, and fluid (such as air) supply means in flow communication with the bellows housing outside of the bellows and operable in response to the bellows.

In another embodiment, the present invention provides a method for enhancing the benefication of minerals or controlling the flow rate of foam, comprising the steps of introducing a foam into a bellows contained in a bellows housing, interrupting the introduction of foam into the bellows at a preselected point of expansion of the bellows, and introducing a fluid such as air under preselected pressure into the bellows housing simultaneously with the interruption of the introduction of the foam into the bellows to contract the bellows and force the foam out of the bellows to provide enhancement of the mineral benefication process.

BRIEF DESCRIPTION OF THE DRAWINGS

A better understanding of the present invention will be had upon reference to the following description in conjunction with the accompanying drawings wherein.

DETAILED DESCRIPTION OF THE INVENTION

Figure 1:
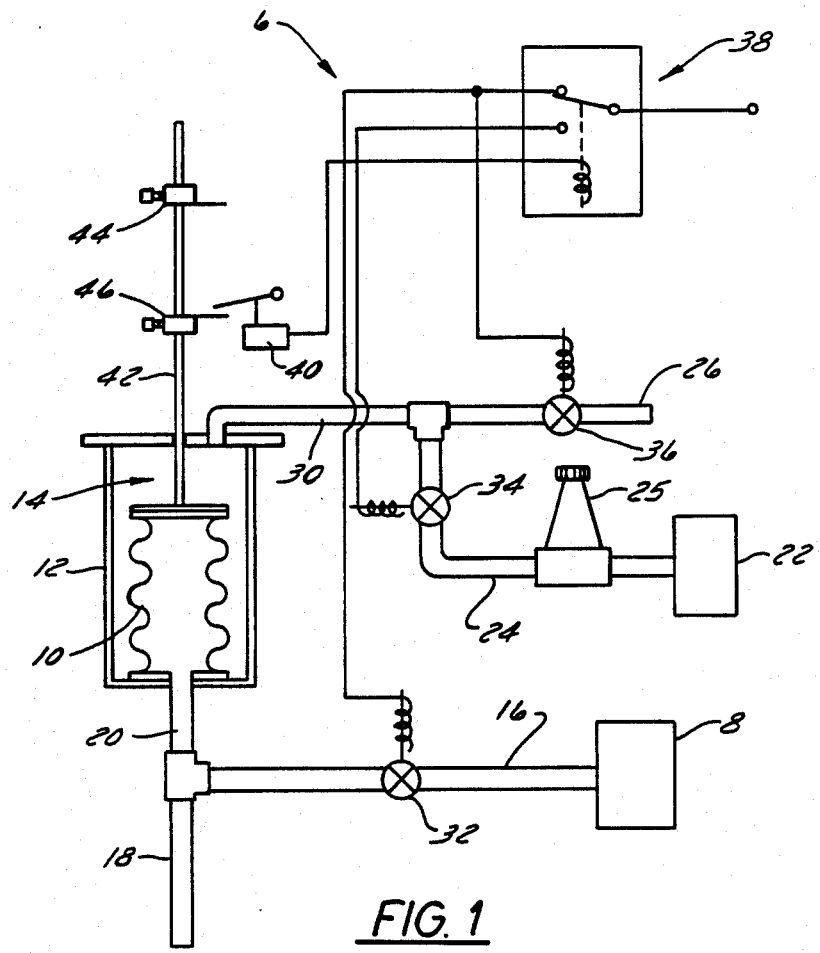
FIG. 1 is a schematic representation of an apparatus of the present invention for controlling the flow rate of foam.

The apparatus shown in FIG. 1 of the drawings provides for a conventionally sized foam generator 8 to operate at a normal discharge rate for only short periods of time. Essentially the foam generator fills the rubber bellows 10 with small bubble foam under pressure, then shuts off until an externally supplied source of air pressure collapses the bellows 10 forcing the small bubble foam out of the bellows 10 t a downstream operation (not shown) which utilizes the small bubble foam. One preferred use of the apparatus is in a froth flotation or mineral benefication operation, where the foam consists of water, a selected surfactant and air to produce foam bubbles from 50 to 200 microns in diameter. The discharge rate from the bellows 10 is controlled by the external air pressure supplied on the bellows.

An apparatus 6 for controlling the flow of foam from a foam generator 8 to a downstream operation is shown in FIG. 1 as including the bellows 10 enclosed in a bellows housing 12. The bellows 10 serves as an expandable container. The volume of the housing surrounding the bellows 10 defines a bellows chamber 14. The interior of the bellows 10 is in flow communication with the foam generator 8 by a foam inlet line 16. The interior of the bellows 10 is in flow communication with, for example, a downstream operation by a foam outlet line 18. As is shown in the drawing, the interior of the bellows 10 is not in fluid communication with the bellows chamber 14. The foam outlet line 18 and foam inlet line 16 join with a common foam conduit 20 which opens into the interior of the bellows 10. A source of pressurized air 22 is in gas flow communication with the bellows chamber 14 of the bellows housing 12 through an air inlet line 24. A fluid (air) regulator 25 can be positioned in the air inlet line 24. The setting of the air regulator 25 may be used as a means to control the discharge rate of the foam into a froth flotation or mineral benefication processes. The bellows chamber 14 is also in flow communication with, for example, the ambient environment through an air discharge line 26. The air inlet line 24 and air exhaust line 26 join with a common air conduit 30 which opens into the bellows chamber 14.

A first solenoid valve 32 is located in the foam inlet line 16 to control the flow of foam therethrough from the foam generator 8 to the interior of the bellows 10. A second solenoid valve 34 is located in the air inlet line 24 to control the flow of air therethrough from the air source 22 to the interior of the bellows chamber 14. A third solenoid valve 36 is located in the air discharge line 26 to control the flow of air being exhausted therethrough from the bellows chamber 14. The first, second, and third solenoid valves are each operatively connected to an electrical relay 38. The functioning of the relay 38 is in turn controlled by a two position switch 40. The two position switch 40 is operated between its two positions by a control rod 42 affixed to a movable end of the bellows 10 and extending through an opening in the top end of the bellows housing 12 adjacent to the two position switch 40. A pair of adjustable switch operators 44 and 46 are attached to the control rod 42 outside of the housing 12 and project from the rod 42 in spaced apart relationship. The arms 44, 46 move with the rod 42 as the bellows 10 contracts and expands. This process is controlled by the extension and the collapse of the bellows 10 which moves the control rod 42 with the two adjustable switch operators 44 and 46 in a longitudinal direction of the control rod 42 back and forth past the two way switch 40.

In the lower position of the rod 42 corresponding to the collapsed position of the bellows 10 the switch operator 44 has opened the two position switch 40, de-energizing the relay 38. In this condition the first solenoid valve or foam supply valve 32 in the input foam line 16 and the third solenoid valve 36 in the air discharge line 26 are both energized to an open position and the second solenoid valve or air supply valve 34 is de-energized to a closed position. This allows the Foam Generator 8 to operate at its normal discharge rate to fill the bellows 10 with foam through the foam inlet line 16 and common conduit 20. As the bellows 10 fills with foam, the bellows 10 expands and the air in the bellows chamber 14 is expelled through the air discharge line 26 past the open third solenoid valve 36 to atmosphere.

As the bellows 10 is filled with foam and thereby extended, the switch operator 46 on the control rod 42 shifts the two position switch 40 to the closed position to energize the relay 38, the first and third solenoid valves 32 and 36 (which were energized) are de-energized to closed positions, and the second solenoid valve 34 in the air inlet line 24 is energized to an opened position. This allows air to enter the bellows chamber 14 through the air inlet line 24 and the pressure of the air in the chamber 14 collapses the bellows 10 forcing the foam out of the bellows 10 through the common conduit 20 and foam outlet line 18, thus completing the cycle. The amount of foam to achieve optimal beneficiation varies according to many factors, including the type of mineral being separated, the specific gravity of the pulp, the density of the gangue, etc., such that the amount of foam required will usually be left to the empirical judgment of the operator to obtain the desired results.

Figure 2:
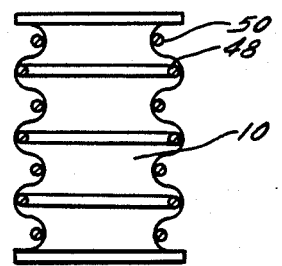
FIG. 2 is a side sectional view of the bellows component of the apparatus of FIG. 1.

FIG. 2 of the drawing shows a cross-section of the rubber bellows 10. The bellows material is normally made of rubber only about 1/16 inch in thickness. Since both the internal foam pressure and the external air pressure can cause the convolutions of the bellows to collapse, stainless steel rings 48 and 50 are installed. The larger rings 48 are placed inside the bellows to support the convolutions when external pressure is applied. The smaller rings 50 are installed around the bellows to support the convolution when internal foam pressure is developed. The bellows 10 can be of any size determined by the desired operating requirements. Normally the bellows is about 4 inches diameter by 10 inches long.

The foregoing detailed description is given primarily for clearness of understanding and no unnecessary limitations are to be understood therefrom, for modifications will become obvious to those skilled in the art upon reading this disclosure and may be made without departing from the spirit of the inventor and scope of the appended claims. For example, piston and cylinder means (not shown) could be substituted for bellows means 10; and electrical components 38, 32, 34, 36 and 40 could be replaced by hydraulically or pneumatically actuated valves (not shown). In this embodiment, the disclosed invention could be operated in a hazardous environment, such as a coal mine.

I claim:

1. A method for controlling the flow rate of foam comprising the steps of:
   introducing from into an expandable and contractable bellows contained in a bellows housing in which the inside of the bellows is not in fluid communication with the bellows housing;
   interrupting the introduction of said foam into said bellows at a preselected point in the expansion of the bellows; and
   introducing pressurized air into said bellows housing to collapse the bellows, thereby forcing said foam out of said bellows.

2. The method of claim 1, further comprising performing the step of interrupting the introduction of foam into said bellows and the step of introducing air into said bellows housing substantially simultaneously.

3. The method of claim 2 wherein said foam is small bubble foam comprising bubbles having an average diameter less than 0.015 inches.

4. The method of claim 2 wherein said foam is small bubble foam having bubble size diameters between 0.002 and 0.008 inches.

5. In a method for separation of mineral particles from mineral-bearing ore, wherein said ore has been ground into fine particles comprising a mixture of mineral particles and non-mineral gangue particles, and said mixture of fine mineral and gangue particles has been combined with water and chemicals to form a pulp having an upper surface and having a desired specific gravity selected to effect separation of said mineral particles from said gangue, the improved method of separating mineral particles from said pulp of mineral and gangue particles, comprising the steps of:
producing a quantity of small bubble foam from a mixture of air, water and surfactant forced through a foamer having tortuous passages therein each of said small bubbles comprising a highly stressed film surrounding an air pocket;
introducing a selected quantity of said small bubble foam into an apparatus having bellows means for containing said small bubble foan and having metering and relay means to control the quantity and delivery of said small bubble foam introduced into said bellows means; and
interrupting said introduction of said small bubble form into said bellows means after a selected quantity of said small bubble foam has been received into said bellows means; forcing said selected quantity of said small bubble foam out of said bellows means and introducing said selected quantity of said small bubble foam below the surface of said pulp,
whereby the said surface film of each of said small bubbles of said small bubble foam disperses into said pulp leaving a multitude of air pockets which interact with said pulp to entrap said mineral particles of said pulp and effect separation thereof from said gangue particles.

6. The method of claim 5 wherein said small bubble foam comprises foam having an average bubble size less than 0.015 inches.

7. The method of claim 5 wherein said small bubble foam comprises foam having a diameter in the range of 0.002 to 0.008 inches.

8. An apparatus for providing foam at a controlled slow rate, comprising:
an expandable and contractible container having an interior and an exterior;
a foam generator in controlled fluid communication with the interior of said expandable container;
a housing surrounding said container;
a pressurized gas source in controlled fluid communication with the exterior of said expandable container and the interior of said housing;
and control means for sensing the expansion and contraction of said expandable container, for controlling the flow communication of said foam generator with the interior of said expandable container in response to said sensing and for controlling the flow communication of said pressurized gas source with the exterior of said expandable container in response to said sensing;
said control means functioning by sensing the expansion of said container to a certain expanded point and closing said fluid communication with said foam generator and opening fluid communication with said pressurized gas source, causing said container to contract and expel from; and said control means further functioning by sensing the contraction of said container to a certain contracted point and closing fluid communication with said pressurized gas source and opening fluid communication with said foam generator, thereby causing said container to fill with foam and expand.

9. An apparatus for controlling the flow rate of foam, comprising:
means defining a bellows chamber;
an expandable and contractible bellows inside said bellows chamber, said bellows having an interior and an exterior, wherein the interior of said bellows is not in fluid communication with said bellows chamber;
a foam supply means in controlled fluid communication with the interior of said bellows;
an air supply means in controlled fluid communication with said bellows chamber and with the exterior of said bellows; and
means for controlling the communication of said foam supply means with the interior of said bellows and the communication of said air supply means with said bellows chamber in response to the expansion and contraction of said bellows.

10. The apparatus recited in claim 9, wherein said means for controlling further comprises:
a foam supply valve between said foam supply means and said bellows;
an air supply valve between said air supply means and said bellows housing; and
valve control means for sensing when said bellows moves into its contracted and extended positions and, in response to said sensed contracted position, for opening said foam supply valve and for closing said air supply valve, and, in response to said sensed extended position, for opening said air supply valve and for closing said foam supply valve.

11. The apparatus recited in claim 10, wherein said air supply valve and said foam supply valve are solenoid valves, and said valve control means includes a switch actuated in response to the expansion and contraction of said bellows.

12. The apparatus recited in claim 11, and further comprising:
an elongated rod attached to a movable end of said bellows;
first and second arms projecting from said elongated rod at preselected spaced positions, said arms being located so as to actuate said switch when said bellows moves to its contracted and expanded positions; and
said means for controlling further comprising a relay activated by said switch, said relay in turn activating said solenoid valves.

13. The apparatus recited in claim 12, wherein said foam supply means is constructed so as to provide small bubble foam having an average bubble size less than 0.015 inches in diameter.

14. The apparatus recited in claim 12, wherein said foam supply means is constructed so as to provide small bubble foam having a bubble size between 0.002 and 0.008 inches in diameter.

15. A method for separating mineral particles from mineral-bearing ore, comprising the steps of:
grinding said ore into fine particles comprising a mixture of mineral particles and non-mineral gangue particles;
comining said mixture of particles with water and chemicals to form a pulp having an upper surface and having a desired specific gravity;

producing a quantity of small bubble foam from a mixture of air, water and surfactant through a foamer having tortuous passages therein, each of said small bubbles comprising a highly stressed film surrounding an air pocket;

introducing a controlled quantity of said small bubble foam into an expandable container for containing said foam sensing the expansion and contraction of said container and controlling the flow of said foam into and out of said expandable container in response to said sensed expansion and contraction; and forcing said controlled quantity of foam out of said expandable container and introducing said foam below the surface of said pulp;

whereby the surface film of each of said small bubbles disperses into said pulp, leaving a multitude of air pockets which interact with said pulp to entrap said mineral particles of said pulp and separate said mineral particles from said gangue particles.

* * * * *

UNITED STATES PATENT AND TRADEMARK OFFICE
CERTIFICATE OF CORRECTION

PATENT NO. : 4,830,737

DATED : May 16, 1989

INVENTOR(S) : Howard W. Cole, Jr.

It is certified that error appears in the above-identified patent and that said Letters Patent is hereby corrected as shown below:

Column 2, line 61, after "bellows 10" delete "t" and insert therefor --to--; and on line 68, delete "supplied" and insert therefor --applied--. Column 6, line 66, delete "comining" and insert therefor --combining--.

Signed and Sealed this

Twenty-seventh Day of February, 1990

*Attest:*

JEFFREY M. SAMUELS

*Attesting Officer*   *Acting Commissioner of Patents and Trademarks*